United States Patent [19]

Noguchi et al.

[11] 4,094,776
[45] June 13, 1978

[54] METHOD FOR TREATMENT OF OIL-CONTAINING WASTE WATER BY USING AN OIL ADSORBENT

[75] Inventors: Kosaku Noguchi, Tokyo; Kiyoharu Yoshimura, Izumi; Honami Tanaka, Izumi; Masao Hayashi, Izumi, all of Japan

[73] Assignee: Koa Oil Co., Ltd., Tokyo, Japan

[21] Appl. No.: 708,716

[22] Filed: Jul. 26, 1976

[30] Foreign Application Priority Data

Oct. 6, 1975  Japan ................................ 50-119824
Nov. 27, 1975  Japan ................................ 50-141180

[51] Int. Cl.² ............................................. C02B 9/02
[52] U.S. Cl. ............................. 210/27; 210/30 A; 210/40; 210/DIG. 26
[58] Field of Search ............ 210/27, 40, DIG. 26, 210/30 A, 36, DIG 5, 33

[56] References Cited

U.S. PATENT DOCUMENTS

| 3,732,162 | 5/1973 | McCoy et al. | 210/40 |
| 3,770,628 | 11/1973 | Yamamoto et al. | 210/40 |
| 3,892,661 | 7/1975 | Siviour et al. | 210/40 |

*Primary Examiner*—Charles N. Hart
*Assistant Examiner*—Ivars Cintins

[57] ABSTRACT

An effective and regenerable oil adsorbent is obtained from a pitch-like substance formed by heat-treating a heavy hydrocarbon oil to such an extent that the volatile matter content thereof is about 10% by weight to about 60% by weight, preferably about 30 to about 50% by weight. By using this oil adsorbent, oil-removing purification treatment of oil-contaminated water can be effectively achieved with economical advantages.

6 Claims, 1 Drawing Figure

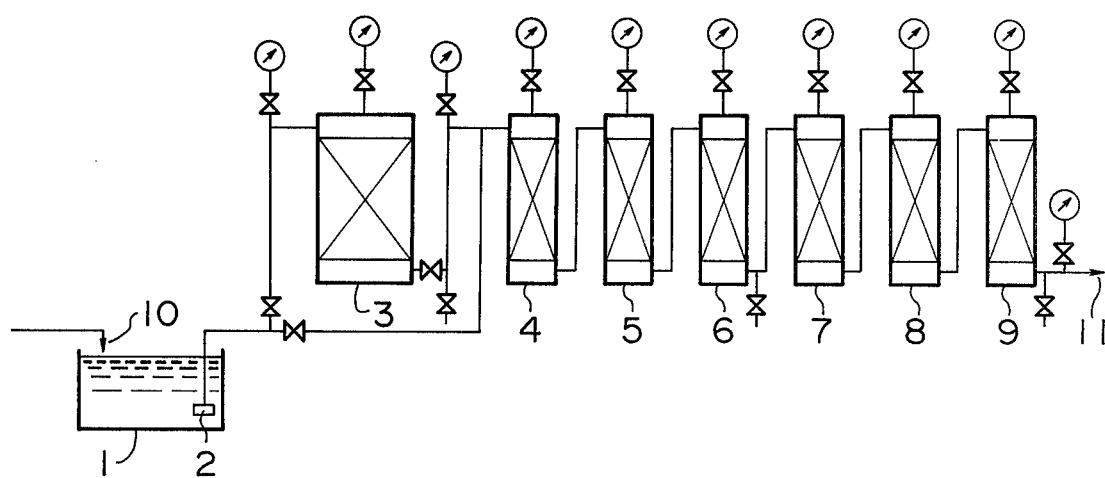

METHOD FOR TREATMENT OF OIL-CONTAINING WASTE WATER BY USING AN OIL ADSORBENT

BACKGROUND OF THE INVENTION

(1) Field of the Invention

The present invention relates to a novel oil adsorbent suitable for oil-removing purification treatment of oil-contaminated water, a process for preparation thereof and uses of this novel oil adsorbent.

By the term "oil-contaminated water" used herein is meant industrial waste water having a relatively high oil content, which is discharged from a petroleum refinery or other factory waste water from ships, supply water from oil-contaminated water sources, and water of oil-contaminated rivers, lakes, bays and oceans.

Treatment of contaminated waters is very important for prevention of environmental pollution, and various attemps have heretofore been made to remove oils from oil-contaminated waters. Since regulations on disposal of waste waters are now very rigorous, development of effective and economical methods for the treatment of oil-contaminated waters is eagerly desired.

(2) Description of the Prior Art

Various methods have heretofore been proposed for the treatment of oil-contaminated waters, easpecially oil-containing waste water. For example, there can be mentioned (1) a gravity separation method in which oil-containing waste water is kept stationary in a tank, oil drops contained in the waste water are caused to rise to the surface by virtue of the difference in specific gravity and the oil drops are separated by, for example, a separator of the API or CPI type, (2) a flocculating separation method or coagulation process in which a flocculant such as aluminum sulfate, an iron salt or the like is added to oil-containing waste water to adjust the pH and destroy the oil emulsion phase, and oils are co-precipitated together with solids formed by the reaction in the form of flocs, and (3) an air floatation method in which compressed air is blown into waste water to generate air bubbles in the waste water and oils are caused to rise in the state carried by the air bubbles.

These known methods, however, are defective in various points. For example, the method (1) is not substantially effective for the treatment of waste waters containing emulsified oils, especially those having emulsified oil drops of a size smaller than about 60 microns, and further, a vast area is necessary for practising the method (1). The method (2) is advantageous in that not only free oils but also emulsified oils can be separated, but the method also requires a vast area for its practising and is defective in that the treatment of flocs involves difficulties. The method (3) is not suitable for the treatment of large quantities of waste waters.

In short, each of these known methods is disadvantageous from the economical view-point and the treatment cost is high, and no satisfactory results can be obtained when contaminated water containing oils at relatively high contents and discharged in large quantities, such as waste waters from petroleum refinery are treated.

There is also known an adsorption separation method using an oil adsorbent. As the oil adsorbent applicable to this method, there are known solid granular adsorbents formed by subjecting polymers such as polyesters, polyvinyl chloride, polystyrene and polyolefines to certain treatments. For example, a solid granular product manufactured by Chiba Fine Chemical Co., Tokyo, Japan is commercially available under the tradename "PIC" as the polyolefine-type oil adsorbent. These commercial oil adsorbents are considerably effective, and the method using such oil adsorbent is advantageous over the above methods (1), (2) and (3) in the point that the effect of reducing the oil content in waste water can be attained assuredly by a simple operation with the use of a treatment apparatus having a relatively compact structure. This adsorption separation method, however, is still insufficient. More specifically, an oil adsorbent such as mentioned above is relatively expensive and the regeneration treatment for reactivating the once used adsorbent is very troublesome and involves high costs. In general, therefore, the once used oil adsorbent is discarged or burnt, and hence, the method is also not advantageous from the economical view-point. In order to regenerate the once used oil adsorbent, it is necessary to adopt a complicated method. For example, the used adsorbent is treated with a solvent to dissolve only the adsorbed substances (oils) into the solvent and regenerate the adsorbent, and if necessary, the adsorbed substances are separated and recovered from the solvent. Alternately, the adsorbed substances are separated from the adsorbent by heating or mild reaction with water vapor or other gas to thereby regenerate the adsorbent. Such regeneration treatment is very troublesome and costs much money, and hence, the conventional adsorption separation method is economically unsatisfactory. Therefore, development of a cheap oil adsorbent having a high adsorbing property and being capable of being regenerated with ease has been desired in the art.

SUMMARY OF THE INVENTION

The present invention relates to an oil-removing purification treatment of oil-contaminated waste waters according to the adsorption separation method. More particularly, the invention relates to an oil adsorbent being excellent in the capacity of adsorbing and collecting oils contained in waste waters and capable of being regenerated with ease to restore its activity after it has been used, a process for the preparation of such excellent oil adsorbent, and a method for treating oil-containing waste waters by using such oil adsorbent.

It is a primary object of the present invention to provide a novel process of using an oil adsorbent having a high oil-adsorbing capacity, which can be regenerated by simple means.

Another object of the present invention is to provide a waste water treatment method according to which oils can be separated and recovered from oil-containing waste waters effectively and economically advantageously.

It has been found that a pitch-like substance formed by heat treatment of a heavy hydrocarbon oil, especially one having a volatile matter content (as measured according to the method of JIS M-8812) of about 10% by weight to about 60% by weight, has a very high oil-adsorbing capacity and after it has been used, the high adsorbing capacity can easily be restored by a simple regenerating method. This pitch-like substance shows an effective oil-adsorbing action when used in the powdery or granular form or other suitable form. Thus, if this pitch-like substance is used as an oil adsorbent in the adsorption separation method, it is possible to provide an very effective oil-removing treatment for removing oil from oil-containing waste waters. Since this oil adsorbent can be regenerated by a simple method after it has been used, the waste water treatment method using this oil adsorbent is very advantageous from the economical viewpoint.

The foregoing and other objects and advantages of the present invention will be apparent from the following detailed description and the accompanying drawing.

BRIEF DESCRIPTION OF THE DRAWING

The drawing is a flow sheet illustrating one preferred embodiment of the waste water treatment method using a specific oil adsorbent of the present invention. de

DETAILED DESCRIPTION OF THE INVENTION

The oil adsorbent of the present invention consists essentially of a pitch-like substance of the powdery or granular form or other suitable form which is obtained by heat-treating a heavy hydrocarbon oil to such an extent that the volatile matter content (the volatile matter content referred to in the instant specification is one as measured according to the method of JIS M-8812) thereof is about 10% by weight to about 60% by weight.

The term "heat-treating" or "heat treatment" used in the instant specification means to maintain a heavy hydrocarbon oil at a temperature sufficient to advance decomposition or poly-condensation reaction of the heavy hydrocarbon oil and generate gases or other volatile components such as oil vapors. As is well-known in the art, when a heavy hydrocarbon oil is heat-treated, decomposition or polycondensation takes place in the oil to form a pitch-like substance composed of a mixture of various hydrocarbon compounds differing in molecular weight within a considerably broad range. The present invention is based on the finding that hydrocarbons having a long chain alkyl groups are contained in this pitch-like substance and these long chain alkyl groups are oleophilic and excellent in the oil-adsorbing capacity. That is, it has been found that when the heat treatment conditions are controlled so that the volatile matter content in the resulting pitch-like substance is in the range of from about 10% by weight to about 60% by weight, the above tendency is high and the product has a remarkably high oil-adsorbing capacity.

When the volatile matter content is lower than about 10% by weight, the heat treatment effect is excessive in the product and the content of inactive carbonized components increases while the content of oleophilic polymerized hydrocarbon components decreases. If the volatile metter content is higher than about 60% by weight, the product contains large quantities of low-molecular-weight light hydrocarbon compounds and the content of oleophilic components having oil-adsorbing capacity is low. Further, the product having a higher volatile matter content is often too soft and it is difficult to shape the product into an easy handling form, for example, a powdery or granular form.

As will be apparent from the foregoing illustration, in the present invention, it is very important that the volatile matter content in the pitch-like substance obtained by heat-treating a heavy hydrocarbon oil should be in the range of from about 10% by weight to about 60% by weight. In view of experimental results and from the economical view-point, it is preferred that the volatile matter content in the pitch-like substance be in the range of from about 30% by weight to about 50% by weight.

When a heavy hydrocarbon oil is heat-treated, as the degree of the heat treatment increases, the volatile matter content gradually decreases while the carbon content and solvent-insoluble contents (benzene-insoluble, quinoline-insoluble and pyridine-insoluble component contents defined with respect to ordinary pitches according to JIS K-2425) increase. Accordingly, any one of these contents can be adopted as the factor indicating the degree of the heat treatment. In the present invention, however, the volatile matter content is adopted as the factor indicating the degree of the heat treatment because the volatile matter content can be determined very easily.

The pitch-like substance having a volatile matter content within the above-mentioned range, i.e., the oil adsorbent of the present invention, can generally be obtained by maintaining a starting heavy hydrocarbon oil at a temperature of about 400° C to about 450° C. in a reaction vessel for about 0.1 to about 15 hours and removing volatile components generated by the treatment, such as gases and oil vapors. Removal of volatile components is accomplished by passing them through a pipe into a condenser. When a prescribed treatment time has passed, the pitch-like substance left in the reaction vessel is withdrawn therefrom. In general, a preferred pitch-like substance having a volatile matter content of about 30 to about 50% by weight is obtained by conducting the above heat treatment at about 430° C for about 40 – 120 minutes. In practical operation, however, such heat treatment temperature and time vary depending on the kind of the starting heavy hydrocarbon oil and other treatment conditions described below, for example, depending on whether or not agitation is conducted during the process or on the period of time over which the temperature is elevated to the prescribed heat treatment temperature. Thus, it is generally recommended to perform a simple preliminary test to determine heat treatment conditions suitable for obtaining a pitch-like substance having desirable properties.

In general, in order to prevent occurrence of undesirable side reactions, it is preferred that the heat treatment be conducted in an atmosphere of an inert gas (such as nitrogen gas, carbon dioxide gas or hydrocarbon gas), and in order to maintain a homogeneous state in the reaction system during the reaction, it is preferred that the heat treatment be carried out under agitation. These preferred conditions, however, are not indispensable conditions, but are appropriately adopted according to the structure and scale of a reaction apparatus used or other factors.

As regards the temperature-elevating rate adopted for increasing the temperature to the prescribed heat treatment temperature, a temperature elevating rate ordinarily adopted in carbonization of coal and the like, for example, a temperature elevating rate of about 3° C/min can be employed without any trouble. Of course, higher or lower temperature elevating rate may be used. However, since the heat treatment temperature and time for the formation of pitch-like substance vary depending on the heat history at the temperature elevating stage, in order to obtain products of consistent quality, it is preferred that the temperature elevating rate be fixed in view of the heat treatment apparatus actually employed and the practical heat treatment operation.

The above-mentioned process for the preparation of the oil adsorbent of the present invention may be worked not only batchwise but also in a continuous manner, and if it is possible to obtain products having desirable properties, either the batchwise process or the continuous process can be employed with equal success.

The heavy hydrocarbon oil that is used as the starting substance in the present invention includes not only petroleum heavy residual oils such as topped residual oils, vacuum residual oils, deasphalted residual oils, thermal cracked residual oils and catalytic cracked oils, but also heavy hydrocarbons such as natural asphalt, tar sand oil, shale oil and coal tar. In these heavy hydrocarbon oils, the ratio of aromatic hydrocarbons to aliphatic hydrocarbons or the content of hetero atoms such as sulfur, nitrogen and oxygen is of no significance. In view of the facility and efficiency of the above-mentioned heat treatment, it is preferred that the boiling point of the starting heavy hydrocarbon oil be higher than about 350° C. Most of the above exemplified hydrocarbon oils satisfy this requirement regarding the boiling point.

When the so-obtained pitch-like substance, namely, the oil adsorbent, is used for an ordinary packed layer in conventional adsorption separation method, it is preferred that the resulting massive product be pulverized and sieved to obtain an amorphous granular product having an average diameter of about 2 to 10 mm. The preferred average diameter, however, varies depending on the dimension and structure of the packed adsorbing column, and it is determined after due consideration of the allowance of pressure reduction of waste water and insurance of a sufficient surface area of the adsorbent for adsorption of oils. Further, the oil adsorbent is used for a flowing or fluidized bed as well as for the packed layer. Accordingly, it may be used after it has been molded into granules. Moreover, the oil adsorbent may be used in the form of powder having a size smaller than 2 mm or it may be shaped into a suitable form according to need.

As pointed out hereinbefore, the selective adsorbing activity of the adsorbent of the present invention to oils owes to the fact that the adsorbent is composed of a mixture of various hydrocarbon compounds having a long chain alkyl group. It is well-known and theoretically established based on various experimental results that a long chain alkyl group is oleophilic and hydrophobic and has a chemical structure resembling that of a petroleum hydrocarbon. In addition to the presence of large quantitites of active hydrocarbons having a long chain alkyl group, the following facts are also believed to enhance the oil adsorbing effect of the oil adsorbent of the present invention. Namely, the pitch-like product having a volatile matter content of about 10% by weight to about 60% by weight according to the present invention can be shaped into a form preferred for the adsorbing effect, such as powder or granule giving a homogeneous solid phase by which the contact or entanglement of the long alkyl group with oil molecules in the solid-liquid interface can easily be established.

In fact, when hydrophobic characteristics (namely, oleophilic characteristics) of surfaces of solid pitch-like substances were compared based on contact angles to water drops, it was found that pitch-like substances having a volatile matter content of at least 40% by weight have a contact angle of 90° to 120°, while pitch-like substances having a lower volatile content have a smaller contact angle, for example, a pitch-like substance having a volatile matter content of 10% by weight has a contact angle as small as 70° to 80°. Thus, it was confirmed that excessive heat treatment tends to reduce the oleophilic characteristics. In summary, in the oil adsorbent of the present invention formed by moderate heat treatment of heavy hydrocarbon oil, it is believed that various oleophilic substances differing in molecular weight and chemical structure as the hydrocarbon, form a homogeneous solid phase in a manner whereby the high oil-adsorbing activity of each oleophilic substance can be fully retained.

As another reason why the oil adsorbent of the present invention has a high oil adsorbing effect, it is referred to that the pitch-like substance prepared by the above heat treatment has on the surface thereof a great number of micropores having a diameter smaller than about 200 microns, which can be observed under a microscope. In connection with active carbon and interfacial physical phenomena, it is well known that such microscopic configuration of the solid surface is closely concerned with the adsorbing effect, and it is apparent that also in the oil adsorbent of the present invention, such porous surface makes contributiona to enhancement of the oil adsorbing effect. In this connection, as the degree of the heat treatment is increased and the volatile matter content is reduced, the coke structure is developed and micropores are readily formed, resulting in enhancement of the above surface adsorbing effect. However, the essential effect of selectively adsorbing oils in the oil adsorbent of the present invention is based on the chemical structure of the pitch-like substance, and this effect is reduced or lost by excessive heat treatment.

In the present invention, after generic consideration of the foregoing factors, it has been found that most preferred results are obtained when the heat treatment is conducted to such an extent that the volatile matter content is about 10 to about 60% by weight, especially about 30 to 50% by weight. This will be understood from Examples given hereinafter.

The most characteristic feature of the oil adsorbent of the present invention is that after it has been used for adsorption of oils and has contained large amounts of oils adsorbed therein, it can readily be regenerated by a simple treatment to restore the inherent high adsorbing capacity. As pointed out hereinbefore, conventional adsorbents of this type are defective in that since it is troublesome and difficult to regenerate them, after they have been used once for the adsorption treatment, they have to be discarded or burnt. In contrast, the oil adsorbent of the present invention is characterized in that the used adsorbent can be regenerated completely by very simple means, namely by heat-treating the used adsorbent directly. This will readily be understood if only the process for the preparation of the pitch-like substance, i.e., the oil adsorbent of the present invention is taken into consideration. More specifically, the starting material of the oil adsorbent of the present invention is a heavy hydrocarbon oil containing low-molecular weight oils having properties resembling those of oils to be adsorbed. The oil adsorbent of the present invention is a product obtained by heat-treating such heavy hydrocarbon oil to effect polycondensation of some of these low-molecular-weight oils and separate the remainder of these low-molecular-weight oils as distilled oils. Accordingly, the heat treatment of the used adsorbent is nothing but repetition of the preparation process. Since the adsorbent has passed through the heat treatment at the preparation stage, a heat treatment of a lower degree is sufficient for regeneration of the used adsorbent, as seen from Examples given hereinafter. Further, the used adsorbent may be used as a portion of the starting materials for preparing oil adsorbent according to the invention by incorporating the used adsorbent into a fresh starting heavy hydrocarbon oil. Since the oil adsorbent of the present invention is composed of hydrocarbon compounds and inherent combustible, the used adsorbent can, of course, be conveniently disposed by burning or may be regenerated by a method using a solvent according to need.

Characteristic features of the present invention are as follows:

In the first place, as illustrated in the Examples given hereinafter, a very high oil-removing effect can be attained by the oil adsorbent of the present invention. Further, such effective oil adsorbent can be obtained merely by the simple heat treatment of various heavy oils as industrial by-products. At the same time, distilled oils and small amounts of hydrocarbon gases formed in the heat treatment can readily be recovered. Since the thus recovered distilled oils and gases have properties resembling those of distilled oils and gases obtained by distillation of crude oil, they can be formed into commercial petroleum products and peteroleum gas products by customary treatment methods. That is, from another point of view, the process of the preparation of oil adsorbent according to the present invention can be also regarded as a process for the preparation of light oils and gases from heavy oils. Therefore, the starting heavy oil can be utilized substantially completely, and consequently the oil adsorbent can be provided at a very low cost. Still further, the used adsorbent containing oils adsorbed therein can easily be regenerated by a simple heat treatment, and when it is more convenient to do so the used adsorbent can, since it is highly combustible, be readily burnt and a large heat energy can be obtained. Accordingly, the adsorbent of the present invention is especially suitable for the waste water treatment or the like in which the oil adsorbent is used in a large quantity.

In accordance with another aspect of the present invention, there is provided an oil-containing waste water purifying treatment method according to which the oils contained in waste water can be effectively removed by the use of the above-mentioned oil adsorbent.

According to the waste water treatment method of the present invention, an oil-containing waste water to be treated is passed through a column or drum type of oil adsorbing vessel packed with a powdery or granular oil adsorbent composed of the above-mentioned pitch-like substance obtained by the heat treatment of a heavy hydrocarbon oil, and if necessary, the so treated waste water is further treated by passing it through a drum or column packed with active carbon, whereby not only oils but also suspended solids, dyes and bad smell causing components contained in the waste water can be removed by the simple operation and a sufficient purifying effect can be attained. In this waste water treatment, it is possible to use one oil adsorbing vessel packed with the oil adsorbent or a plurality of vessels in combination. In the latter case, it is preferred that vessels packed with the oil adsorbent are arranged so that the water-passing order may be changed optionally. In a preferred embodiment of the waste water treatment according to the present invention, the waste water to be treated is subjected to sand filtration by passing it through a sand filtration column or drum, prior to the passage through the oil adsorbing vessel packed with the oil adsorbent. In this sand filtration column or drum, fine suspended solids causing trouble in the subsequent oil-adsorbing vessel, such as algae, shells, mud and mineral granules, are removed. In addition, a known solid precipitation tank or oil separator may be disposed before this and filtration column. The waste water which has passed through the sand filtration column is transferred through the oil-adsorbing vessel without causing such troubles as clogging and during the passage of the waste water through the oil-adsorbing vessel the oil adsorbent displays its effect sufficiently.

The filtration treatment to be carried out before passing the waste water through the oil-adsorbing vessel to remove suspended solids is not limited to sand filtration, but in view of easy availability, ease of maintenance and filtration effect of the filtering medium, the use of sand filtration is especially preferred.

In the sand filtration column or drum used for carrying out such sand filtration, sand having a particle size ranging from about 0.25 mm to about 3.0 mm is generally packed. For example, sand is packed into a column so that an upper layer of fine sand (having a particle size of about 0.25 to about 0.35 mm) and a lower layer of coarse sand (having a particle size of about 1.0 to about 3.0 mm) are formed in the column, and these two sand layers are supported by, for example, a fine gravel layer (composed of gravel having a size of about 4.0 to about 7.0 mm), a medium gravel layer (composed of gravel having a size of about 7.0 to about 11.0 mm) and a coarse gravel layer (composed of gravel having a size of about 11.0 to about 23.0 mm).

The amount of packed sand and the thickness of the packed sand in the sand filtration column are empirically determined so that suitable space velocity and filtration layer-passing speed are attained according to the amount of waste water to be passed through the filtration column. It is also possible to form in the top portion of the filtration column a layer of anthracite (coal powder having a particle size of about 2 mm), whereby the backward flowing operation can be facilitated and the filtration can be conducted stably for a long time.

The oil-containing waste water which has thus been treated in the sand filtration column is then fed to the oil-adsorbing vessel packed with the oil adsorbent of the present invention. Since suspended solids have been completely removed in the sand filtration column, oils can be effectively adsorbed and removed in the oil-adsorbing vessel, and the so treated water can be discarded at it is but according to a preferred embodiment, the so treated waste water is finally passed through a column packed with active carbon, whereby dissolved impurities and the like can be adsorbed and removed and the oil content can be further reduced. As a result, the waste water is discharged as colorless, transparent, odorless, completely purified water. As the active carbon to be packed in this active carbon column, there can be employed granular carbon having a size customarily adopted in this field, for example, 0.42 to 1.68 mm. Respective columns are aligned, for example, as shown in the accompanying drawing, and one or more active carbon columns may be disposed in the final stage of the treatment system.

The accompanying drawing is a flow sheet illustrating one preferred embodiment of the typical column arrangement for practising the waste water treatment of the present invention, in which reference numerals 1, 2 and 3 denote an oil separator, a pump and a sand filtration column, respectively, each of reference numerals 4, 5 and 6 denotes an oil-adsorbing column, each of reference numerals 7, 8 and 9 denotes an active carbon column, and reference numerals 10 and 11 denote an inlet for waste to be treated and an outlet for purified water, respectively.

The structure and effects of the present invention and embodiments of regeneration of the oil adsorbent of the present invention will now be described in detail by reference to the following Examples that by no means limit the scope of the invention.

EXAMPLE 1 (Preparation of the oil adsorbent of the present invention)

As the petroleum heavy oil, vacuum residual oil from Arabian light crude oil, as shown in Table 1, was used, and it was maintained at a prescribed temperature for 10 minutes to 15 hours to obtain 8 kinds of pitch-like substances differing in the volatile matter content.

Conditions adopted for preparation of pitch samples, such as the treatment temperature, the heat treatment time and the performance of agitation or blowing of $N_2$ are as shown in Table 2.

Properties of the so obtained pitch samples are as shown in Table 3. The volatile matter content of each sample was determined by the following method according to JIS M-8812:

The sample was placed in a phantom crucible provided with a lid, and it was heated at 900° C for 7 minutes while preventing it from coming in contact with air. The weight percent of the ignition loss to the sample was determined, and the volatile matter content was obtained by reducing the previously determined water content from the thus calculated weight percent of the ignition loss.

Table 1

Properties of Starting Heavy Oil

| Kind of Starting Oil | Specific Gravity (15/4° C) | Viscosity (cSt at 100° C) | Conradson Carbon Residue (% by weight) | Aromaticity, fa |
|---|---|---|---|---|
| Vacuum residual oil from Arabian light crude oil | 0.985 | 243 | 16.5 | 0.41 |

Table 2

Conditions for Production of Pitch Samples

| Sample No. | Treatment Temperature (° C) | Retention Time at Treatment Temp. (minutes) | Agitation | Blowing of $N_2$ |
|---|---|---|---|---|
| 1 | 430 | 10 | effected | effected (300 cc/min) |
| 2 | 430 | 40 | effected | effected (300 cc/min) |
| 3 | 430 | 90 | effected | effected (300 cc/min) |
| 4 | 430 | 120 | effected | effected (300 cc/min) |
| 5 | 430 | 180 | not effected | effected (300 cc/min) |
| 6 | 430 | 300 | not effected | not effected |
| 7 | 430 | 900 | not effected | not effected |
| 8 | 450 | 900 | not effected | not effected |

Table 3

Properties of Oil Adsorbents

| Sample No. | Bulk Density (g/cm³) | Volatile Matter Content (% by weight) | Softening Point (° C) | Benzene-Insoluble Component Content (% by weight) |
|---|---|---|---|---|
| 1 | 0.61 | 56.0 | 150 | 34.5 |
| 2 | 0.62 | 42.4 | above 200 | 55.2 |
| 3 | 0.65 | 31.1 | above 200 | 75.0 |
| 4 | 0.64 | 30.9 | above 200 | 76.5 |
| 5 | 0.65 | 28.6 | above 200 | 81.0 |
| 6 | 0.68 | 17.4 | — | — |
| 7 | 0.69 | 11.8 | — | — |
| 8 | 0.70 | 10.9 | — | — |
| 9 | 0.32 | — | — | — |

*comparative commercially available oil adsorbent

EXAMPLE 2 (Oil adsorption test)

The oil adsorbing effects of the oil adsorbent samples Nos. 1, 2, 3 and 4 prepared in Example 1 were tested according to the following method. The oil adsorbing effect of the comparative commercially available oil adsorbent sample No. 9 (a polyolefine type oil adsorbent manufactured and sold under tradename "PIC" by China Fine Chemical Co., Tokyo, Japan) was similarly tested.

Each sample was pulverized to a size of 6 to 10 mesh and 300 of the pulverized sample was packed in a cylindrical glass tube having a diameter of 60 mm to form an oil adsorbing layer. Starting water containing 100 ppm of oils in the homogeneous state was passed down through this oil adsorbing layer at a rate of 300 ml per minute and the oil content in the effluent was measured when the integrated amount of water passed from the start of the treatment reached 3 liter, 5 liter, 10 liter, 15 liter, 20 liter and 40 liter, to thereby examine the change of the oil-adsorbing capacity of the oil adsorbent. The oil content in the treated water was measured according to the following n-hexane extraction test method according to JIS K-0102.

The sample water was treated directly with n-hexane to form a n-hexane extract, or a floc layer formed by mixing the sample water with a suitable flocculant or adsorbent, or a filter cake formed by filtering the sample water by using a suitable filtering medium was treated with n-hexane to form a n-hexane extract. Then, n-hexane was distilled from the n-hexane extract and the weight of the residue was measured to determine the content of the n-hexane-extracted substances, i.e., barely volatile oils contained in the sample water, such as hydrocarbons, hydrocarbon derivatives, greasy oily substances and the like.

Obtained results are as shown in Table 4. As will be apparent from these results, in case of any of the samples Nos. 1 to 4 of the present invention, the oil content of 100 ppm in the starting water was reduced to about 10 ppm or less, and it was found that each sample had a durable oil-adsorbing effect. When these results are compared with results obtained by using a commercially available oil adsorbent being generally evaluated as being effective (sample No.9), it will readily be understood that the oil adsorbent of the present invention prepared from a heavy hydrocarbon oil has very excellent oil adsorbing capacity.

Table 4

Results of Oil Adsorbing Test according to Water Flowing Method (oil content, ppm, after passage of starting water containing 100 ppm of oils through oil adsorbent layer)

| Sample No. | Volatile Matter Content (% by weight) | Integrated Amount (liter) of Water Passed through Oil Adsorbent Layer | | | | | |
|---|---|---|---|---|---|---|---|
| | | 3 | 5 | 10 | 15 | 20 | 30 | 40 |
| 1 | 56.0 | 6.0 | 4.8 | 5.2 | 6.6 | 5.8 | 6.6 | 5.6 |
| 2 | 42.4 | 7.1 | 6.5 | 7.0 | 8.0 | 5.8 | 6.6 | 4.4 |
| 3 | 31.0 | 8.0 | 11.0 | 7.8 | 10.6 | 9.2 | 10.0 | 12.1 |
| 4 | 30.9 | 9.1 | 8.8 | 8.8 | 9.1 | 6.2 | 8.2 | 6.8 |
| 9 | commercially available oil adsorbent | 0.4 | 0.8 | 3.0 | 5.4 | 5.9 | 6.0 | 6.0 |

EXAMPLE 3 (Oil-adsorbing test)

The oil-adsorbing effects of samples Nos. 2, 5, 6, 7 and 8 prepared in Example 1 and shown in Table 3 were tested according to the following method.

Each sample was pulverized to a size of 6 to 10 mesh and a prescribed amount, shown in Table 5 (300, 200 or 100 g), of the pulverized sample and 1 liter of starting water containing 100 ppm of oils were charged into a separation funnel and the mixture was violently shaken for 5 minutes. Then, water was separated by decantation and the oil content was determined according to the n-hexane extraction method of JIS K-0102 described in Example 2. Obtained results are shown in Table 5, from which it will readily be understood that each sample had an excellent oil-adsorbing effect even in the treatment method much simpler than the treatment method described in Example 2.

Table 5

Results of Oil Adsorbing Test according to Shaking Method (oil content, ppm. after shaking of starting water containing 100 ppm of oils with oil adsorbent)

| Sample No. | Volatile Matter Content (% by weight) | Amount (g) of Oil Adsorbent Incorporated into 1 liter of Starting Water | | |
|---|---|---|---|---|
| | | 300 | 200 | 100 |
| 2 | 42.4 | 2.1 | 2.4 | 8.6 |
| 5 | 28.6 | 4.1 | 3.8 | 8.4 |
| 6 | 17.4 | 3.0 | 3.2 | 6.1 |
| 7 | 11.8 | 3.3 | 2.6 | 4.6 |
| 8 | 10.9 | 2.5 | 1.9 | 3.2 |
| 9 | commercial oil adsorbent | 4.0 | 7.6 | 11.0 |

EXAMPLE 4 (Test for regeneration of the oil adsorbent used for oil adsorption)

The sample No. 2, which has sufficiently high oil adsorbing effects as shown in Examples 2 and 3, was tested for regeneration according to the following test method.

Into 1 liter of starting water containing 100 ppm of oils was incorporated 200 g of the sample No. 2 which had been sufficiently impregnated or saturated with gas oil, and the adsorbing effect was tested according to the same shaking method as described in Example 3. Naturally, no oil-removing effect was attained. Thus, this gas oil-saturated pitch was regenerated by subjecting it to a moderate heat treatment as described hereinbefore. More specifically, the temperature was elevated at a rate of 3° C/min to 430° C and then, the samples was naturally cooled immediately (regenerated sample A). Separately, the temperature was elevated to 400° C at a temperature-elevating rate of 3° C./min, and the sample was maintained at this temperature for 30 minutes and then naturally cooled (regenerated sample B). The oil adsorbing effect of each of the regenerated samples was tested according to the same shaking method as described in Example 3. Obtained results are shown in Table 6, from which it will readily be understood that the oil adsorbent of the present invention can be regenerated by a simple heat treatment as described above.

Table 6

Results of Oil Adsorbing Test of Regenerated Oil Adsorbent according to Shaking Method

| | Original Oil Adsorbent (sample No. 2) | Oil-Saturated Oil Adsorbent | Regenerated Oil Adsorbent | |
|---|---|---|---|---|
| | | | Sample A | Sample B |
| Regeneration treatment temperature | — | — | 430° C. | 400° C |
| Regeneration temperature retention time | — | — | 0 minute | 30 minutes |
| Volatile Matter content (% by weight) | 42.4 | — | 40.2 | 41.0 |
| Oil content (ppm) in treated water* | 2.4 | 100 | 1.3 | 2.2 |

*starting water having an oil content of 100 ppm was treated according to the shaking method described in Example 3.

A preferred embodiment of the oil-containing waste water treatment method according to the present invention will now be described.

EXAMPLE 5

Oil-containing waste water was treated in a continuous manner by using a test apparatus comprising a sand filtration column and an oil adsorbing column, and, at prescribed intervals, the waste water was collected at the inlet of the sand filtration column, the inlet of the oil adsorbing column and the outlet of the oil adsorbing column and the oil content in each collected water was determined according to the n-hexane extraction method of JIS K-0102 described in Example 2.

Details of the sand filtration column and the oil adsorbing column are as follows:

Sand Filtration Column
 Inside diameter: 342.8 mm
 Height      : 1,540 mm

| Packed Substances (from top to bottom) | Packed Thickness(mm) |
|---|---|
| Anthracite (coal powder of a particle size of about 2 mm) | 300 |
| Sand (particle size of 0.6 to 2 mm) | 200 |
| Sand (particle size of 1.5 to 3 mm) | 100 |
| Gravel (diameter of 4 to 7 mm) | 100 |
| Gravel (diameter of 8 to 12 mm) | 100 |
| Total Packed Thickness | 800 |

Oil Adsorbing Column
 Inside diameter: 204.7 mm
 Height      : 1,540 mm

| Packed Substance | Packed Thickness (mm) |
|---|---|

-continued

| | |
|---|---|
| 31 kg of oil adsorbent of pitch-like substance | 1,400 |

The above oil adsorbent used in this example was a pitch having a volatile matter content of about 40% by weight prepared by maintaining the vacuum residual oil shown in Table 1 at a temperature of about 430° C, for 1 hour, under agitation and $N_2$ blowing.

Properties of this oil adsorbent were as follows:
Bulk density:0.63 g/cm³
Softening point:above 200° C.
Benzene-insoluble component content:53.7% by weight This oil adsorbent was pulverized to a size of about 2 to 8 mm and then packed in the oil adsorbing column.

Table 7
Results of Measurement of Oil Content

| | Run No. | | | | |
|---|---|---|---|---|---|
| | 1 | 2 | 3 | 4 | 5 |
| Flow rate (liter/min) of waste water | 13 | 2.6 | 2 | 7.6 | 11 |
| Water temperature (° C) | 43 | 36 | 30 | 29 | 29 |
| Oil content (ppm) | | | | | |
| at inlet of sand filtration column | 4.3 | 21.3 | 5.6 | 62.6 | 9.9 |
| at inlet of oil adsorbing column | 2.8 | 3.1 | 3.6 | 3.5 | 1.3 |
| at outlet of oil adsorbing column | 1.5 | 1.0 | 1.4 | 1.1 | 1.0 |

As will be apparent from the results shown in Table 7, in the treated water sampled at the outlet of the oil adsorbing column the oil concentration was reduced to a level of 1.0 to 1.5 ppm regardless of the changes of the oil content and flow rate of the starting waste water.

In a practical apparatus, a plurality of oil adsorbing columns may be disposed in series, and if waste water is treated by using such apparatus, it is expected that a further improved effect will be attained.

In order to confirm that the waste water treating effect is enhanced by disposing an active carbon-packed column after the oil adsorbing column, the following experiment was conducted.

The treated water (having an oil content of 1.5 ppm) obtained at the above oil adsorbing test was passed at a flow rate of 110 to 640 ml/min through a layer of commercially available active carbon (having a diameter of 0.42 to 1.68 mm) packed in a thickness of 500 mm in a cylindrical glass tube having an inside diameter of 50 mm. The oil content and degree of transparency (according to JIS K-0102) were determined to obtain the following results.

| | before passage through active carbon layer | after passage through active carbon layer |
|---|---|---|
| Oil content | 1.5 ppm | 0.8 ppm |
| Degree of transparency | 18 | above 28 |

From the above results, it will readily be understood that by disposition of an active carbon-packed column, the oil content can be reduced below 1.0 ppm and odorless, transparent water having an improved hue can be obtained.

In a practical apparatus, it is expected that the treating effect can be further enhanced by disposing a plurality of active carbon-packed columns in series and conducting the active carbon treatment in a multi-staged manner.

We claim:

1. A waste water treatment method comprising passing an oil-contaminated waste water through at least one oil adsorbing vessel, wherein a powdery or granular oil adsorbent consisting essentially of a solid, particulate pitch formed by heat treating a heavy petroleum hydrocarbon oil at a temperature of at least 400° C. is packed, said solid, particulate pitch having a volatile matter content of about 10% by weight to about 60% by weight.

2. A waste water treatment method comprising the steps of passing an oil-contaminated waste water through at least one oil adsorbing vessel, wherein a powdery or granular oil adsorbent consisting essentially of a solid, particulate pitch formed by heat-treating a heavy petroleum hydrocarbon oil at a temperature of at least 400° C. is packed, said solid, particulate pitch having a volatile matter content of about 30% by weight to about 50% by weight, discontinuing passage of the oil contaminated waste water through the oil adsorbing vessel, removing the oil-adsorbent having incorporated oils adsorbed therein from the vessel, heat-treating said spent oil-adsorbent having incorporated oils adsorbent therein to regenerate it, and repacking the thus-generated oil-adsorbent in the oil-adsorbing vessel.

3. A waste water treatment method comprising passing an oil-contaminated waste water through at least one oil-adsorbing vessel wherein there is packed a powdery or granular oil-adsorbent consisting essentially of a solid, particulate pitch formed by heat-treating a heavy petroleum hydrocarbon oil at a temperature of at least 400° C., said solid, particulate pitch having a softening point of at least 200° C. and a volatile matter content of about 30% by weight to about 50% by weight.

4. A waste water treatment method according to claim 3 wherein the oil-contaminated waste water to be treated is subjected to sand filtration before it is passed through the oil adsorbing vessel.

5. A waste water treatment method according to claim 3 wherein the treated water coming from the oil adsorbing vessel is further treated with active carbon by passing it through at least one active carbon-packed column.

6. A waste water treatment method according to claim 3 wherein the oil-contaminated waste water to be treated is subjected to sand filtration before it is passed through the oil adsorbing vessel, and the treated water coming from the oil adsorbing vessel is further treated with active carbon by passing it through at least one active carbon-packed column.

* * * * *